United States Patent
Kirstein

(10) Patent No.: US 9,592,751 B2
(45) Date of Patent: Mar. 14, 2017

(54) CHILD SAFETY SEAT FOR USE IN A VEHICLE

(71) Applicant: Hauck (Hong Kong) Ltd, Tsim Sha Tsui, Kowloon (HK)

(72) Inventor: Matthias Kirstein, Hallstadt (DE)

(73) Assignee: Hauck (Hong Kong) Ltd, Kowloon (HK)

( * ) Notice: Subject to any disclaimer, the term of this patent is extended or adjusted under 35 U.S.C. 154(b) by 277 days.

(21) Appl. No.: 14/461,052

(22) Filed: Aug. 15, 2014

(65) Prior Publication Data

US 2016/0046213 A1 Feb. 18, 2016

(51) Int. Cl.
*B60N 2/28* (2006.01)
*A47D 1/10* (2006.01)

(52) U.S. Cl.
CPC ......... *B60N 2/2875* (2013.01); *B60N 2/2803* (2013.01); *B60N 2/2821* (2013.01); *B60N 2/2845* (2013.01); *A47D 1/103* (2013.01); *B60N 2/286* (2013.01)

(58) Field of Classification Search
CPC .. B60N 2/2875; B60N 2/2803; B60N 2/2821; B60N 2/2845; B60N 2/286; A47D 1/103
USPC .............. 297/256.1, 256.11, 256.12, 256.13
See application file for complete search history.

(56) References Cited

U.S. PATENT DOCUMENTS

| | | | | |
|---|---|---|---|---|
| 5,181,761 A * | 1/1993 | Meeker | ................ | B60N 2/2821 297/256.13 |
| 6,428,099 B1 * | 8/2002 | Kain | .................... | B60N 2/2806 297/250.1 |
| 7,059,677 B2 * | 6/2006 | Balensiefer | .......... | B60N 2/2821 297/256.1 |
| 7,090,294 B2 * | 8/2006 | Balensiefer, II | ..... | B60N 2/2806 297/256.13 |
| 7,658,446 B2 * | 2/2010 | Meeker | ................ | B60N 2/2812 297/250.1 |
| 2011/0169309 A1 * | 7/2011 | Williams | ............. | B60N 2/2806 297/256.13 |
| 2011/0193382 A1 * | 8/2011 | Gaudreau, Jr. | ...... | B60N 2/2821 297/256.13 |
| 2013/0119732 A1 * | 5/2013 | Wuerstl | ............... | B60N 2/2806 297/253 |
| 2014/0097653 A1 * | 4/2014 | Chen | ..................... | B60N 2/286 297/256.13 |
| 2014/0265488 A1 * | 9/2014 | Heisey | ................. | B60N 2/2821 297/256.13 |

\* cited by examiner

*Primary Examiner* — Syed A Islam
(74) *Attorney, Agent, or Firm* — Sand & Sebolt

(57) ABSTRACT

A child safety seat comprising a base placeable on and securable to a vehicle seat and a seat element releasably engageable with the base. The base has an inclination adjustor which is selectively adjustable in at least two different positions relative to a base body in order to adjust the inclination of the base with respect to the vehicle seat. The adjustor includes a locking mechanism for locking the adjustor in a selected adjustment position and for releasing the adjustor in order to allow for selection of another adjustment position. An actuator operates the locking mechanism to lock or release the adjustor. The actuator is positioned on the base so that the actuator is covered by the lower surface of the seat element when the latter is fixed to the base. The actuator therefore cannot be accessed without unlocking and separating the seat element from the base.

25 Claims, 9 Drawing Sheets

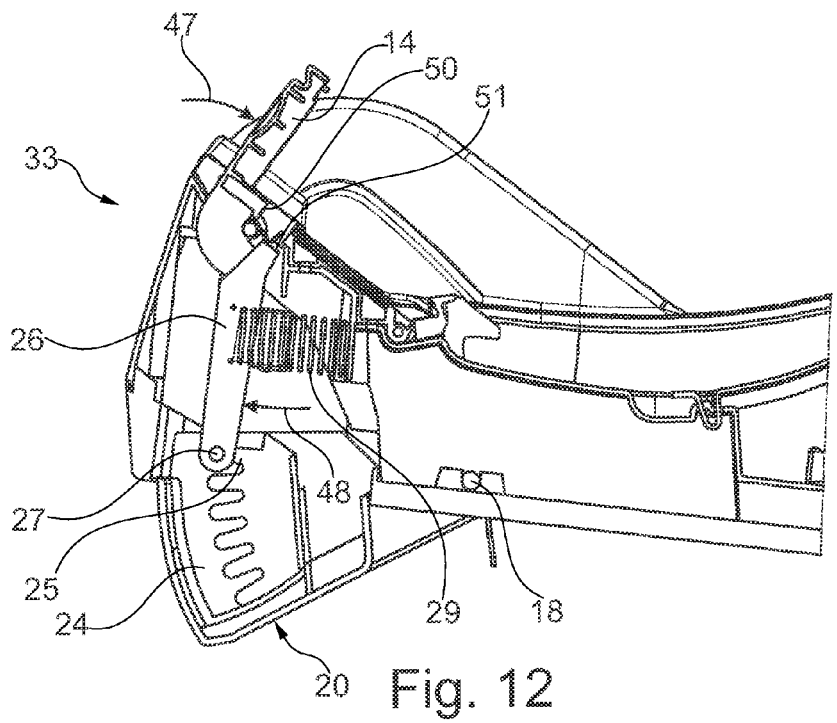
Fig. 12
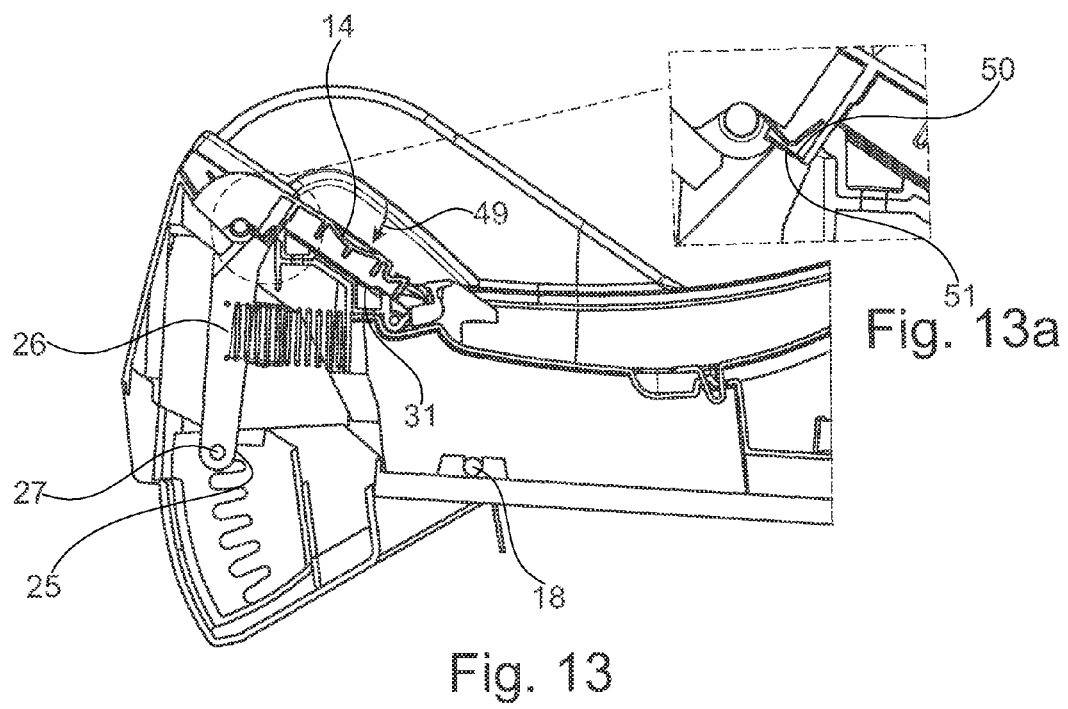
Fig. 13a
Fig. 13

CHILD SAFETY SEAT FOR USE IN A VEHICLE

BACKGROUND OF THE INVENTION

Technical Field

The present invention relates to child safety seats for use in vehicles.

Background Information

It is well-known that transporting children, in particular toddlers or babies, in vehicles is hazardous in the event of an accident. While adults are sufficiently protected by the seatbelts provided in vehicles and, in case of modern vehicles, also by airbags and other safety assistance systems, the existing safety systems installed in vehicles are not designed to sufficiently protect younger people with smaller body sizes such as children, in particular toddlers or babies. So, it is common and in most countries prescribed by law to use child safety seats when transporting children, in particular toddlers or babies, in a vehicle. There is a large variety of child safety seats available on the market with particular designs adapted to particular age groups of children starting with seats for babies (age class 0 and $0^+$) to seats for children in the preschool ages (seats for age class 2).

Modern child safety seats for use in vehicles are often comprised of a base or base element and a seat element or seat shell. The base is designed to be placed on a vehicle seat and fixed to the vehicle seat by of a seat belt of the vehicle. The seat element or seat shell may releasably be coupled and fixed to the base and features the seat surface which receives the child in a seating or lying position. The seat surface is comprised of the seat area for receiving the rear and the upper legs of the child and a backrest supporting the child's back and, if combined with a headrest, the child's head.

In this regard it is known that vehicle seats are different in their shapes and forms, particularly regarding the seat surface which inclines (or reclines) at different angles, usually reclining from a first free end towards the back rest of the vehicle seat at a certain sloping angle. Depending upon the vehicle manufacturer and the model of the vehicle, the sloping angles of the vehicle seats will differ. The base, however, which has to be placed on the seat and fixed to the same by of the vehicle seatbelt, needs to be arranged in a defined orientation with regard to a horizontal reference line. This defined orientation is essential for a safe and reliable connection and securement between the base and the vehicle seat. Consequently, for known child safety seats the respective bases feature inclination adjustor which allow for adjusting the base in order to adapt the base to a given sloping angle of the vehicle seat surface. Such inclination adjustor may contain support struts or similar support elements that may be adjusted at different positions with respect to a base body. These support struts or other elements then typically rest against the reclining section of the seat surface of the vehicle seat bridging the distance between a lower surface of the base body and the seat surface of the vehicle seat in a declined area. In order to facilitate correct adjustment, such base elements often feature level indicators which by suitable means, for example by of optical indication, indicate to the user when he or she has achieved the correct adjustment of the inclination-adjustor in a way that suitably levels the base so that the base may be securely placed on and fixed to the vehicle seat by of the vehicle seatbelt.

In this orientation the base is then fastened and fixed to the vehicle seat by connecting the vehicle seatbelt to a belt receptacle provided on the base. After that, the seat element or seat shell is connected to the base by interlocking a first connector provided on the base with a second connector provided on the seat element. When the first and second connectors are brought together in the correct manner, they releasably lock the seat element to the base, thus firmly keeping the seat element fixed to the base and thus keeping the seat element safely fixed to the vehicle seat.

For known child seats of that type, however, the inclination-adjustor contain manipulation actuators, for example levers, which are accessible from the outside, for example a side face, of the base even in a situation where the seat element is firmly connected to the base. This is a dangerous situation because it presents the possibility of the unintended manipulation of the actuator. For example, if another child is placed in the seat adjacent the child sitting in the child safety seat featuring the inclination-adjustor, and this other child plays around with such lever actuator, they may accidentally adjust the base inclination. This could lead to a loss of safe connection and fixation of the base and hence of the child safety seat to the vehicle seat. In case of an accident this might lead to a loss of protection of the child by the child safety seat and hence to severe injuries to the child.

SUMMARY

Consequently, there is a need in the art to provide a child safety seat which eliminates the drawbacks observed in the prior art. This need is addressed by the child safety seat according to an aspect of the present invention. In another aspect this need is addressed by a base for a child safety seat according to an aspect the present invention.

In a first aspect the invention provides a child safety seat for use in a vehicle which child safety seat comprises:

a base adapted to be placed on and secured to a vehicle seat, said base comprising a base body;

a seat element having an upper surface and a lower surface, the upper surface of the seat element defining a seat area and a backrest;

the seat element further having a first connector provided thereon;

the base having a second connector for lockably interacting with the first connector when the seat element is placed in a receiving position on the base with the lower surface of the seat element facing the base in order to releasably attach the seat element to the base;

the base further having an inclination-adjustor connected to the base body and being selectively adjustable in at least two different adjustment positions relative to the base body for adjusting the inclination of the base with respect to a surface of a vehicle seat the base is placed on;

the inclination-adjustor comprising a locking mechanism for locking the adjustor in a selected adjustment position and for releasing the adjustor in order to allow for selecting another adjustment position;

wherein the locking mechanism comprises an actuator for operating the locking mechanism to lock or release the adjustor and wherein the actuator is placed on the base in a position that is covered by the lower surface of the seat element when the latter is fixed to the base in such a way that the actuator cannot be accessed by a user without unlocking the first and second connectors and separating the seat element from the base.

In another aspect the base of the child safety seat according to the invention contains a belt receiver adapted to receive a vehicle seatbelt in order to secure the base to the vehicle seat whereby the belt receiver comprises a belt clamping element for clampingly fixing the seatbelt to the receiver, wherein said belt clamping element is movable between a clamping position, in which the belt clamping element clampingly fixes the seatbelt fed into the belt receiver, and an open position, in which the belt clamping element releases the seatbelt, wherein the belt clamping element further constitutes the actuator of the locking means.

In another aspect the invention provides a base for a child safety seat adapted to be placed on and secured to a vehicle seat and for interlockingly receiving a seat element, said base having
 a base body;
 an inclination-adjustor connected to the base body and being selectively adjustable to at least two different adjustment positions relative to the base body for adjusting the inclination of the base with respect to a seat surface of a vehicle seat that the base is placed on;
 an upper surface for receiving the seat element with a lower surface thereof resting against said upper surface; and
 a connector for connecting to a seat element being received on the base;
 the inclination-adjustor comprising a locking mechanism for locking the adjustor in the selected adjustment position and for releasing the adjustor in order to allow for selecting another adjustment position;
 wherein the locking mechanism comprises an actuator for operating the locking mechanism to lock or release the adjustor and wherein the actuator is placed on the upper surface of the base.

Further aspects and advantageous embodiments of the invention are defined in the attached claims and will become apparent from the following description of preferred embodiments and referring to the attached drawings.

BRIEF DESCRIPTION OF THE SEVERAL VIEWS OF THE DRAWINGS

In the drawings:

FIG. 1b shows a schematic exploded view of the connecting mechanism for releasably locking and connecting the seat element and the base of the child safety seat according to FIGS. 1 and 1a;

FIG. 12 is an enlarged sectional side view of the part of the base shown in FIG. 7 with the locking mechanism of the inclination-adjustor being in an intermediate step during locking again;

FIG. 13 is an enlarged sectional side view of the part of the base shown in FIG. 7 with the locking mechanism being brought back to the locking state;

FIG. 13a is an enlarged sectional side view of a detail of FIG. 13 two abutment faces cooperating and blocking a locking lever element of the locking mechanism in the locking position.

DETAILED DESCRIPTION

With reference to the Figures which are to be seen as schematic representations only, an exemplary embodiment of the child safety seat according to the invention is disclosed and described in the following. However, the following description of the embodiment shall not be meant limiting the scope of protection which is defined by the appended claims. Particularly, many alternatives and alterations to the presented embodiment will be apparent to a person skilled in the art which also make use of the inventive principles and are covered by the broad scope of the invention as claimed.

Figure 1:
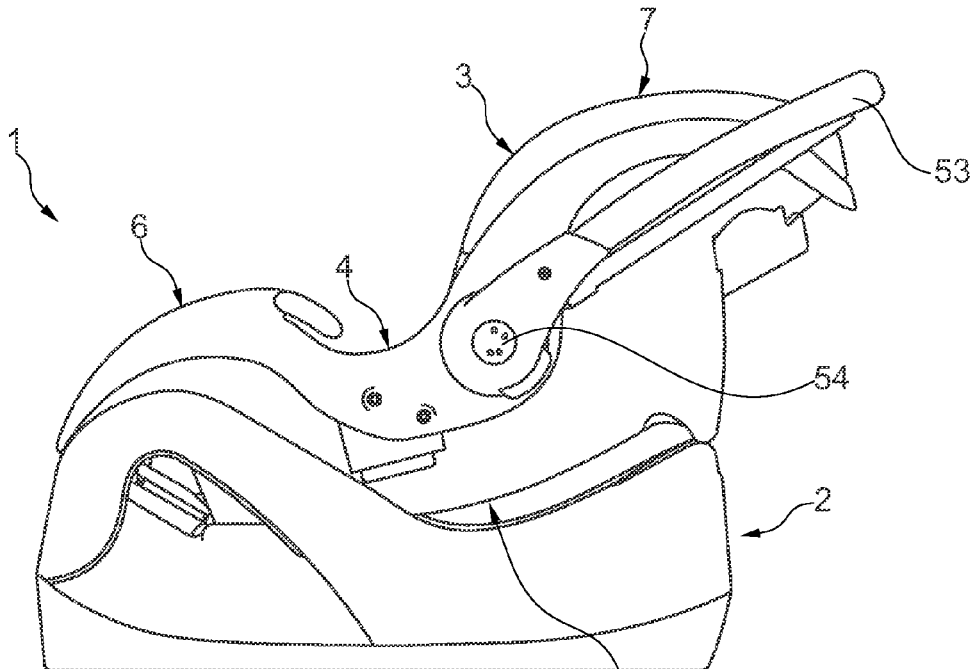
FIG. 1 shows a side view of a child safety seat according to an embodiment of the invention with a base and a seat element connected and locked together.

In FIG. 1, a child safety seat is designated with the reference numeral 1. The child safety seat 1 is generally comprised of a base 2 and a seat element 3 which is shown being set on top of the base 2 and firmly fixed to base 2. The seat element 3 in this embodiment is designed for receiving particular young children, namely babies or toddlers, and designates the child safety seat 1 to be one of class 0/0⁺. Needless to mention that the child safety seat according to the invention might comprise a different seat element being adapted and designed for children of older age, for example a class 1 or class 2 seat. In fact, the child safety seat 1 as shown may be modified to such a child safety seat of different age class by simply keeping the base 2 as it is and merely connecting and locking a different seat element to the given base 2. This kind of flexible opportunity to modify the child safety seat 1 while keeping the same base 2 will be advantageous in that parents of a child will first use the seat element 3 as shown in the Figure when a child is a newborn, baby or toddler and then keep the base 2, replacing only the seat element so as to modify the child safety seat in as the child gets older and grows in size.

The seat element 3 comprises a seat surface 4 being the upper surface of the seat element 3 and a lower surface 5 which faces the base 2. The seat surface 4 contains a seat area 6 and a backrest 7, the seat area 6 being designed to receive the child's bottom and legs, the backrest 7 supporting the child's back and including a headrest to support the child's head.

A handle 53 is rotatably connected to the seat element 3 via hinge connection 54. This handle 53 may be moved from a stored position as shown in FIG. 1 to an activated position where the handle rests atop of the seat element 3 and can be grasped for holding and carrying the seat element 3. Such handles 53 and their connection via respective hinge connections 54 as well as their mode of operation are well known in the art and need not to be described in further detail.

The seat element 3 is releasably and interlockingly connected to the base 2 by of a connecting mechanism which comprises a first connector formed on the seat element 3 and a second connector on the base 2. This is shown in further detail in FIG. 1a.

Figure 1A:
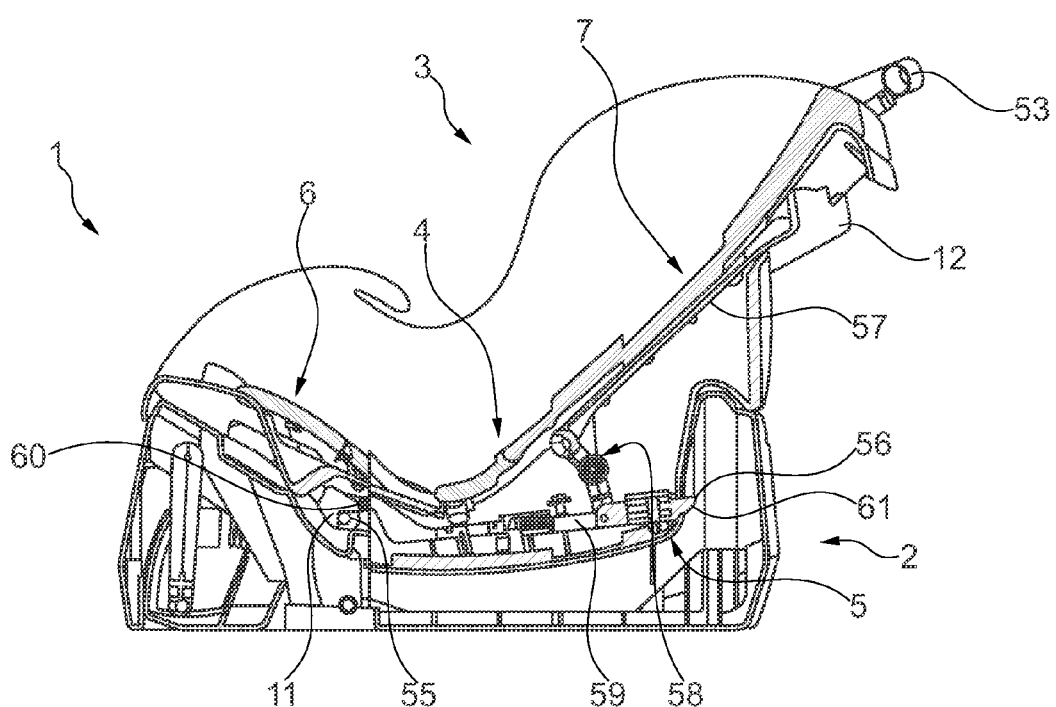
FIG. 1a shows a sectional side view of the child safety seat according to FIG. 1 and depicts a connector which releasably locks the seat element to the base.

FIG. 1a shows a sectional side view of the child safety seat 1 depicted in FIG. 1. This FIG. 1a is included in order to show the connecting mechanism comprising the first and second connectors. The connecting mechanism includes hook elements 11 and receptacles 61 as the second connector on the base 2 as well as locking pins 55 and locking bolts 56 as first connector. The locking pins 55 and locking bolts 56 are parts of the seat element 3 while hook elements 11 and receptacles 61 form part of and belong to the base 2. In the situation shown in FIG. 1a the seat element 3 is releasably connected with and locked to the base 2. In this situation, the lower surface 5 of the seat element 3 fits into and rests in receptacle space 8 (see FIG. 3) of the base 2. The locking pins 55, being part of the seat element 3, are caught by the hook elements 11, while the locking bolts 56 stay inserted into and engage receptacles 61 in the base 3. A release lever 12 is shown which serves for releasing the connecting mechanism. When release lever 12 is pulled, this action will act on and into connecting rods 57 which will be pulled towards the lever 12, i.e. to the upper right in FIG. 1a. The connecting rods 57 act on lever assemblies 58 which transfer the motion action to horizontal rods 59 which will in return be displaced to the left side in FIG. 1a. This displacement of horizontal rods 59 leads to a withdrawing movement of locking bolts 56 which are formed at the respective free ends of horizontal rods 59 shown on the right in FIG. 1a. By this, locking bolts 56 disengage receptacles 61 and release the connection between the seat element 3 and base 2 at that site. Further, horizontal rods 59 with respective abutment faces 60 formed at the opposite free ends thereof, shown at the left in FIG. 1a, abut hook elements 11, forcing these hook elements to move counter-clockwise and release the locking pins 55, thereby releasing the interlocking connection between seat element 3 and base 2 at this site. So, by this action, seat element 3 can be separated from the base 2, taken off the base 2 and carried away and used separately. When the release lever 12 is let go, due to spring forces applied by spring elements (not shown) the horizontal rods 59 will be displaced to the right in FIG. 1a again, moving locking bolts 56 back to their protruding positions within which, when the seat element 3 is set into the base 2 again, the locking bolts 56 protrude into the receptacles 61. When the release lever 12 is let go, this will further release the hook elements 11. Driven by further spring elements 19 (see FIGS. 1b and 5) the hook elements 11 will return to their initial positions, i.e., the catching positions, in which they will catch and lock the locking pins 55.

Figure 1B:
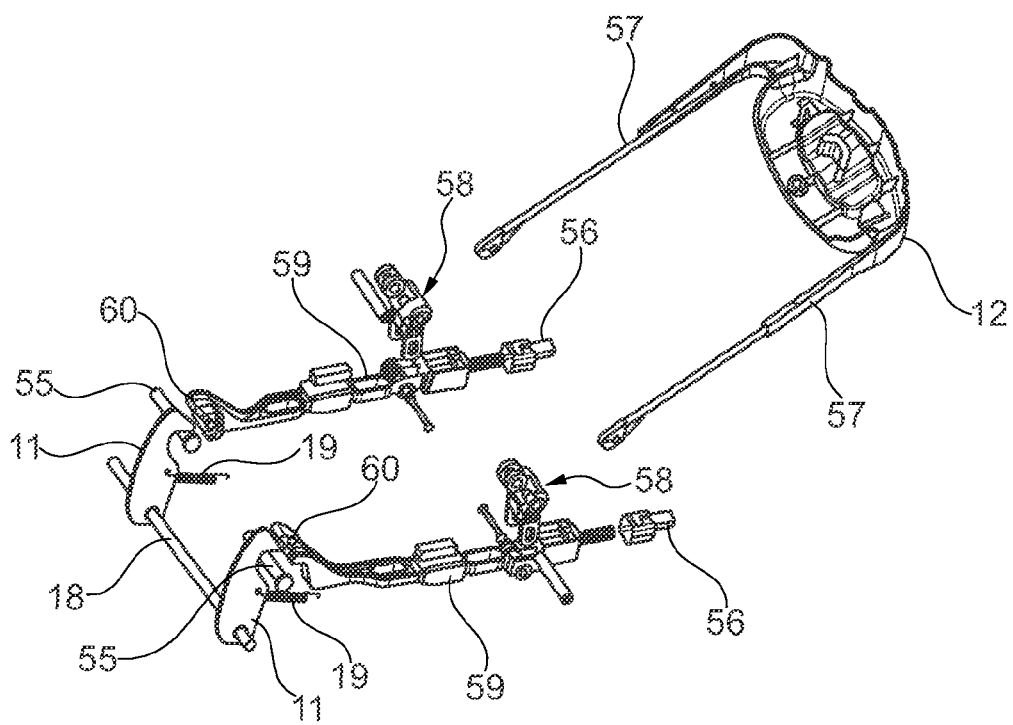

FIG. 1b shows an exploded three-dimensional view of the connecting mechanism showing its most relevant elements. In particular, it is shown that the connecting each are present twofold, i.e. two locking bolts 56, two hook elements 11, two locking pins 55 (and also two receptacles 61, not shown here). Further, the spring elements 19 biasing the hook elements 11 into their respective catching positions are shown. Finally, one may see that the hook elements 11 are fixedly connected to a common axis 18 together with which the hook elements 11 may rotate clockwise and counter-clockwise in order to catch or release the locking pins 55.

Figure 2:
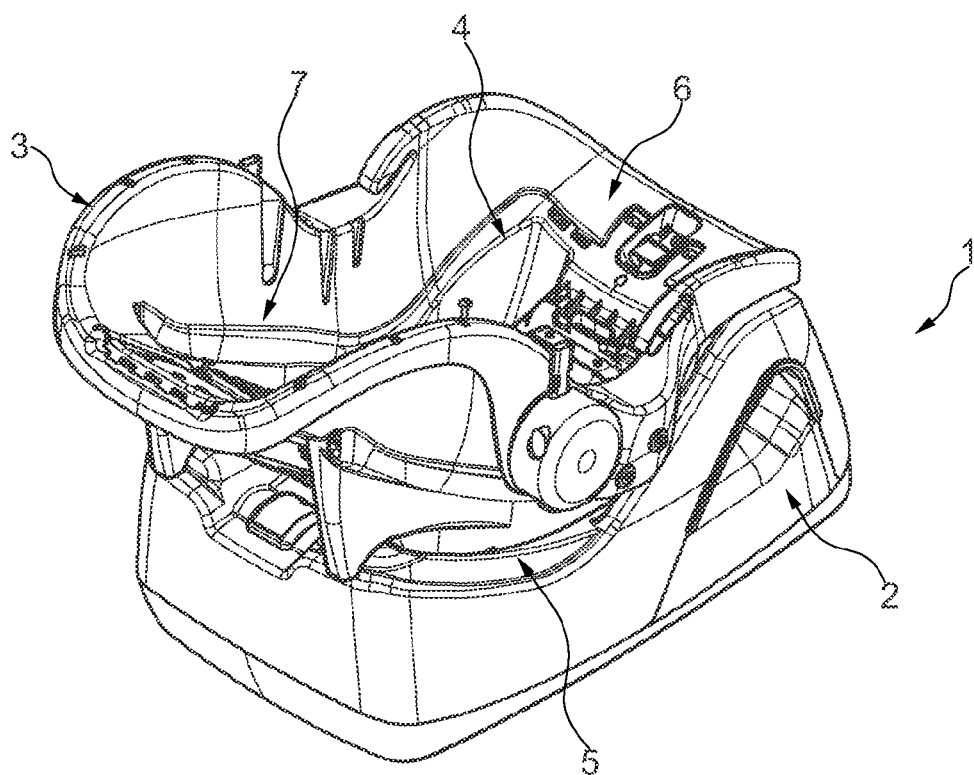
FIG. 2 shows an elevated side view of the child safety seat according to FIGS. 1 and 1a seen from the back rest of the seat element (with the handle not shown)

The child safety seat 1 of FIGS. 1 and 1a is shown in FIG. 2 in another view; while FIG. 1 shows a side view, FIG. 2 represents an elevated three-dimensional view.

Figure 3:
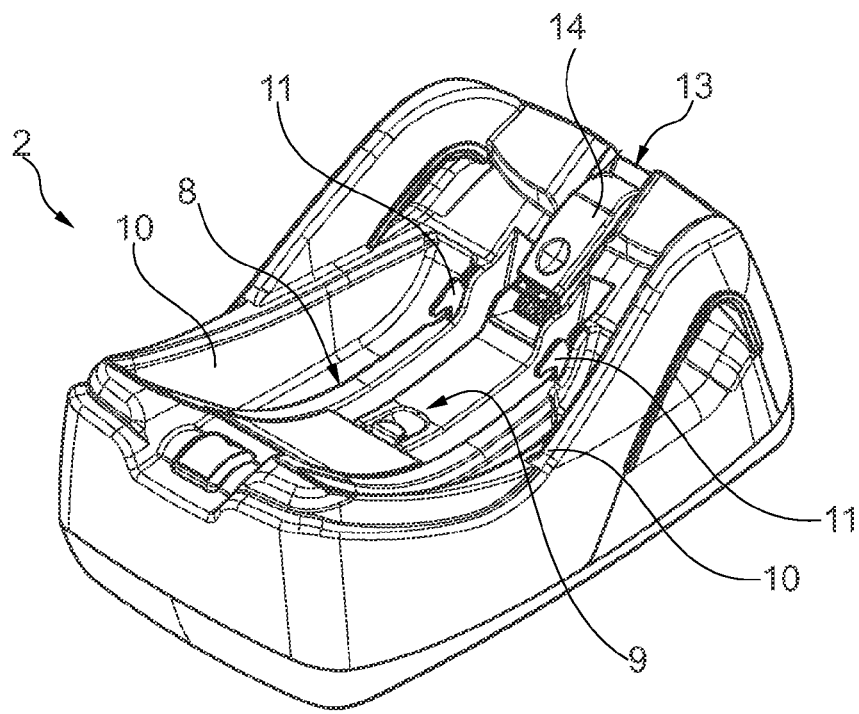
FIG. 3 is an elevated side view of the base shown from the same viewing angle as the one of FIG. 2.
Figure 4:
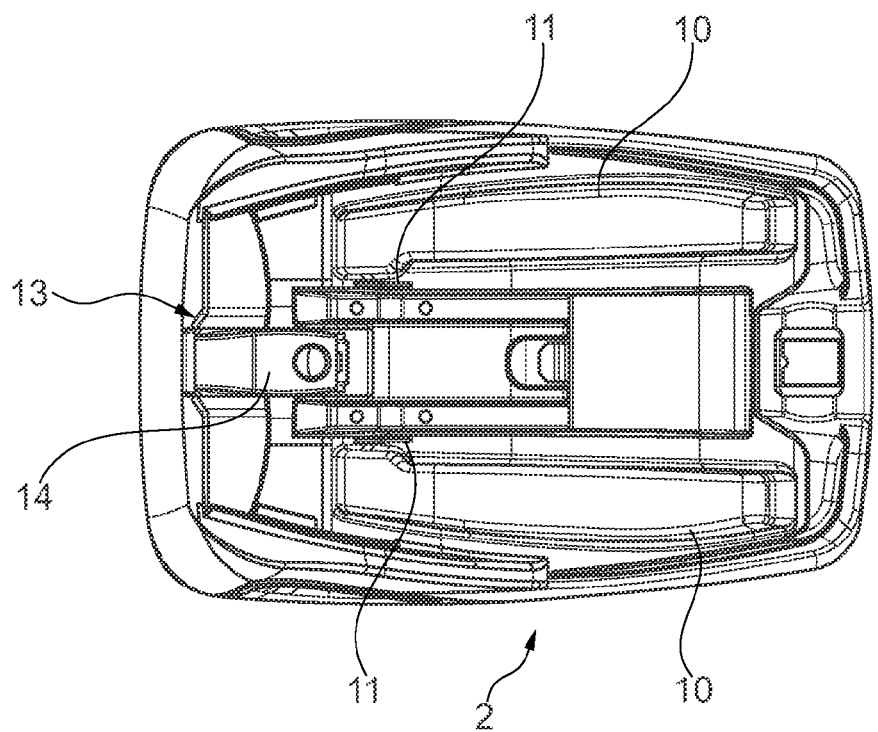
FIG. 4 is a top view of the base according to FIG. 3.

FIG. 3 represents the base 2 of the child safety seat 1 depicted in FIGS. 1 and 2 in a three-dimensional elevated view. FIG. 4 represents the base 2 of FIG. 3 in a top view. In these Figures a receptacle space 8 is shown with a curved ground wall 9 and limiting sidewalls 10. Further, the two hook elements 11 are shown (best seen in FIG. 3). The hook elements 11 form part of the first connector of the base 2 as already described and are movable in order to move back and forth and can be moved bending back by the release mechanism as described above. The hook elements 11 are operated all by the release lever 12 in order to catch or release the locking pins 55 (see FIGS. 1a and 1b) which are part of the seat element 3, being part of the second connector thereof. With the locking pins 55 caught by the hook elements 11 and the locking bolts 56 engaging the receptacles 61, the seat element 3 is firmly bound and fixed to the base 2, as already described. Upon pulling the release lever 12, the hook elements 11 will bend back in order to release the locking pins 55 as well as to withdraw the locking bolts 56 from the receptacles 61 and so to allow separating the seat element 3 from the base 2.

Further, there is a belt clamping mechanism generally designated with reference numeral 13 and comprising a belt clamping lever 14. This belt clamping mechanism 13 serves for clampingly fixing a seatbelt of a vehicle to the base 2 and thereby securing the base 2 to the vehicle seat.

Figure 5:
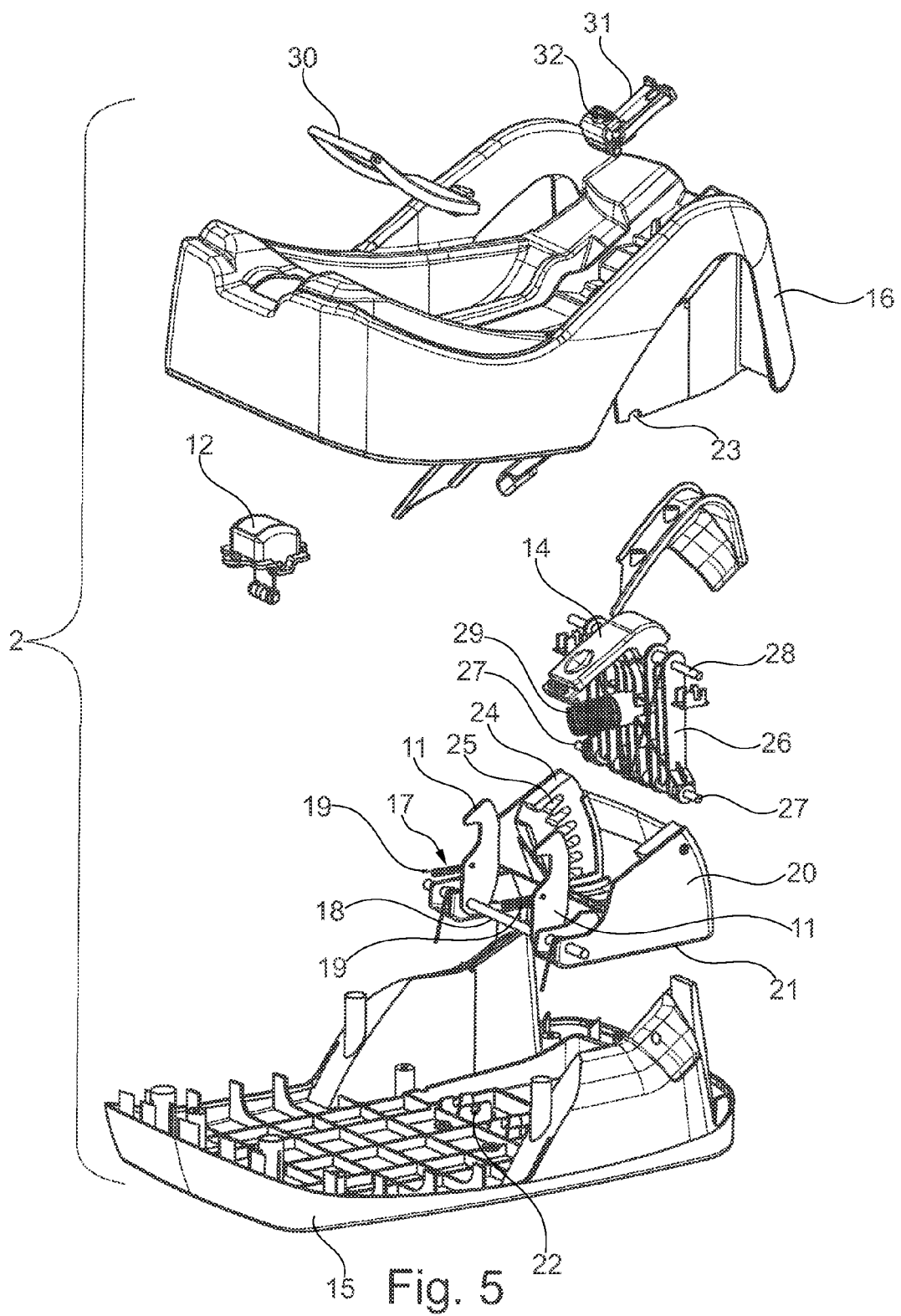
FIG. 5 is an exploded view of the base according to FIGS. 3 and 4.

The design and constructional details of the base 2 are visible in further detail in the exploded view shown in FIG. 5. There it is shown that the base 2 comprises a bottom plate part 15 and an upper housing member 16 which are interconnected. To the bottom plate part 15 there is attached a hook assembly 17 containing the two hook elements 11 which are fixedly connected to axis 18 and may hinge together with said axis 18 when the latter rotates. Spring elements 19 are provided to the hooks elements 11 which force the hook assembly 17 into a locking position with the hook elements 11 bent forward into a locking position in which the hook elements 11 will catch the locking pins 55. The locking pins are part of the seat element and its connector, as already described previously. Connected to the same axis 18 there is an inclination adjustment element 20 which comprises at its bottom side an inclination adjustment plate 21. With the axis 18 held in between axis receptacle elements 22 formed on the bottom plate part 15 and respective cut-outs 23 in the upper housing member 16, it may rotate, allowing the inclination adjustment element 20 to be twisted and moved out of the bottom plate part 15 and into a position where the adjustment element 20 extends beyond and below the lower plane of the bottom plate part 15.

Firmly affixed to the inclination adjustment element 20 are connecting members 24 having a comb-like structure with a plurality of slots 25 formed therein. A locking lever element 26 includes at its lower end a locking element in the form of a locking rod or pin 27. The free ends of the locking rod or pins 27 are formed and dimensioned to fit into any of the slots 25 provided in the connecting member 24. The locking lever element 26 is fixed to another rotational axis 28 which rotational axis 28 is rotatably fixed to the upper housing member 16. So the entire locking lever element 26 may rotate around the rotational axis 28, thereby moving the locking rod 27 back and forth so as to move the latter into or out of a selected one of the slots 25 formed in the connecting members 24. A compression spring 29 is connected to the locking lever element 26 and abuts with the free end (shown in FIG. 5) of an abutment member in the upper housing member 16 (not shown) in order to exert a locking force onto the locking lever element 26; forcing the locking lever element 26 into a position in which the locking rod 27 rests in a pre-set pair of slots 25 in the connecting members 24.

Belt clamping lever 14 is rotatably mounted on the rotational axis 28. Lever 14 also serves as an operation handle for operating the locking mechanism of the inclination-adjustor as will be described further on.

Further shown in FIG. 5 is a cradle like element 30 having a first end connected to the release button 12 and a second end connected to the hook assembly 17 in order to transfer a force and movement caused by pushing the release button 12 to the hook assembly 17. The force moves the hook elements 11 backwards into the release position when the release button 12 is operated (pressed down). Further shown in FIG. 5 is a belt receptacle part 31 which receives the vehicle seatbelt which the base 2 is to be fixed to. The belt receptacle part contains a securing clip 32 designed to interact with the free end of the belt clamping lever 14 to secure said lever 14 in position when firmly engaging the belt receptacle part 31 as will be further described below.

Figure 6:
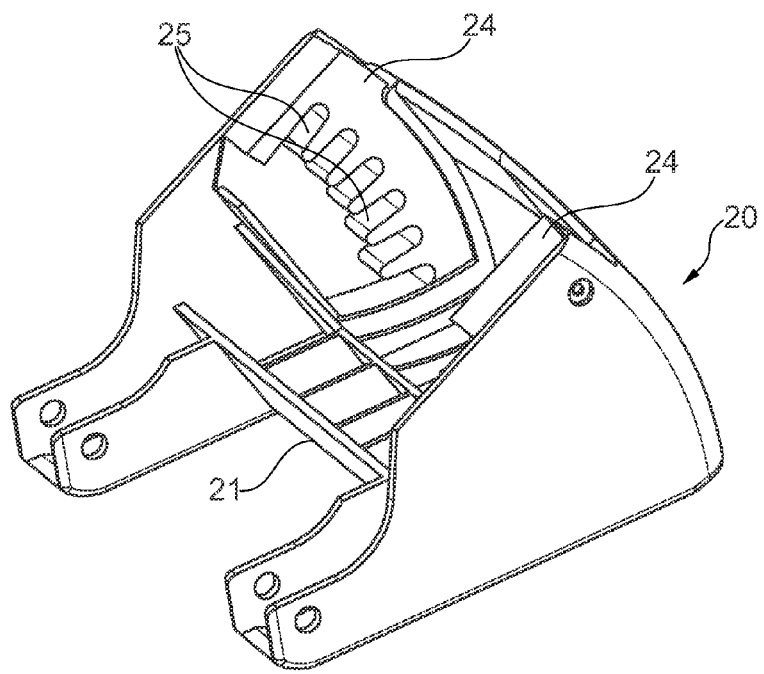
FIG. 6 is an elevated side view of the inclination adjustment element of the base.

In FIG. 6 in an enlarged three-dimensional view there is shown the inclination adjustment element 20 containing the inclination adjustment plate 21 and the connecting members 24. The connecting members have slots 25 formed therein to receive the locking rod 27 in different positions for adjusting different inclination positions of the inclination adjustment element 20.

FIGS. 7 to 14 show sectional side views through part of the base 2 depicting the relevant parts of the locking mechanism for locking and unlocking the inclination-adjustor in different relative positions. The figures are provided in order to explain the operation mode and the cooperation of the respective parts.

Figure 7:
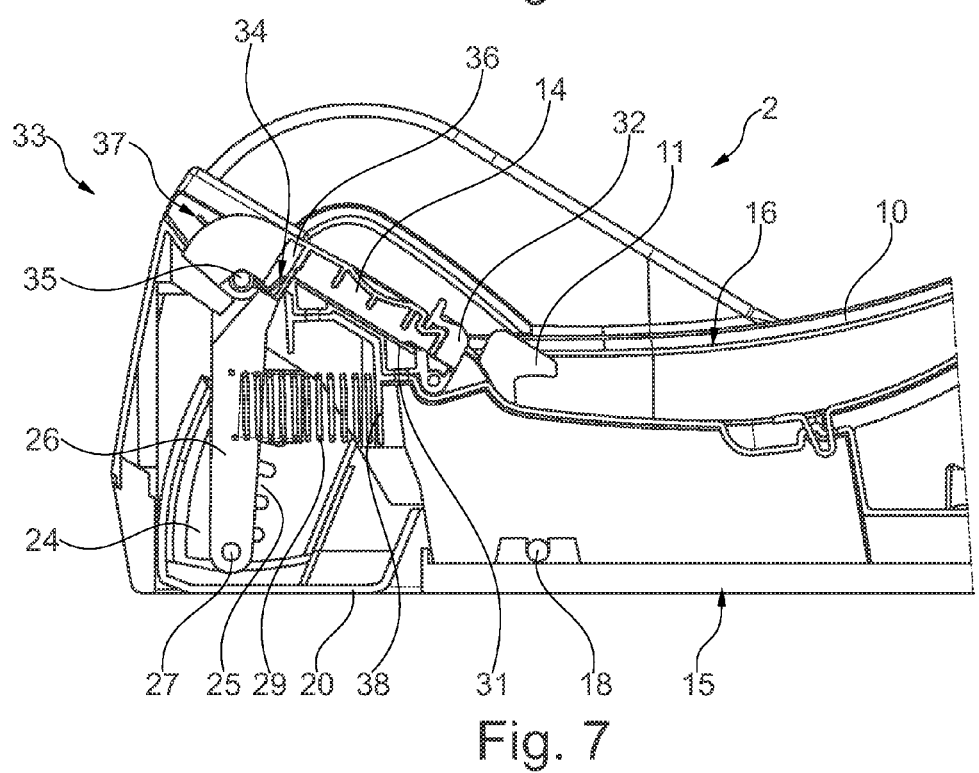
FIG. 7 is an enlarged sectional side view of part of the base showing the assembly of the locking mechanism for locking the inclination-adjustor in a completely locked configuration and with the inclination-adjustor being in a first inclination position.

In FIG. 7 the locking mechanism 33 is shown in a position where the inclination adjustment element 20 lies in a completely retracted position within the body of the base 2. The body is comprised of the bottom plate part 15 and the upper housing member 16 connected together. In this situation and with the relative positions of the members and elements forming part of the locking mechanism 33 shown, the inclination adjustment element 20 is firmly locked in a given first inclination position. As can be seen, the belt clamping lever 14 rests in a clamping position in which the belt clamping lever 14 is firmly pressed against the belt receptacle element 31 so as to clampingly fix the seatbelt introduced between these two elements (not shown here). The belt clamping lever 14 is further secured by the securing clip 32 which engages the free end of the belt clamping lever 14 and keeps the lever 14 down in the clamping position as shown.

The retention spring 34 is set onto an axle pin 35 defining the axis of rotation of the belt clamping lever 14 and rests with one free end in a chamber 36 formed in the belt clamping lever 14 and with another free end 37 resting against a respective bearing formed in the upper housing member. The belt clamping lever 14 is forced by retention spring 34 into the clamping position and against the belt receiving part 31. The locking lever element 26 is pressed into the locking position by of a compression spring 29 which rests against the locking lever element 26 with one end. The second end of the spring 29 rests against an abutment surface 38 formed in the upper housing member 16 of the base 2. In this position as shown, by of the locking mechanism 33, the inclination adjustment which has been set by moving the inclination adjustment element 22 into the desired position and locking the inclination adjustment element 20 by of the interaction between the locking rod 27 and the slots 25 of the connecting members 24 the locking rod 27 rests in, is firmly locked and secured. Simultaneously, the vehicle seatbelt is firmly clamped by the belt clamping lever 14 pressing the seatbelt towards and clamping the seatbelt to the belt receptacle part 31.

In order to assemble the entire child safety seat in this situation, the seat element 3 (compare FIGS. 1 and 2) will be set onto the base 2 and firmly connected and fixed to the base 2. This is accomplished by the hook elements 11 interacting with and catching the connecting rod that is part of the seat element 3. After connecting the seat element 3 to the base 2, it is apparent and will become even clearer from the following description, that the seat element completely covers the upper surface of the base 2 and, in particular, covers the area where the clamping lever 14 is situated. So, there is no access to the clamping lever 14 and, therefore, the clamping lever 14 cannot be manipulated. As the clamping lever 14 acts as the manipulator for manipulating the locking mechanism 33, this that any change of the settings and adjustment of the inclination adjustment element 20 is not possible as long as the seat element 3 is firmly affixed to the base 2. Hence, it is not possible for a child sitting in the seat adjacent the child safety seat to mess around with the inclination-adjustor and thereby either willingly or accidentally unlock the locking mechanism 33. Consequently, a child sitting in the child safety seat built up with the base 2 according to the invention in combination with the seat element 3 is well protected by the base 2; and the child safety seat 1 containing the base 2 always maintains its correct and leveled position.

Figure 8:
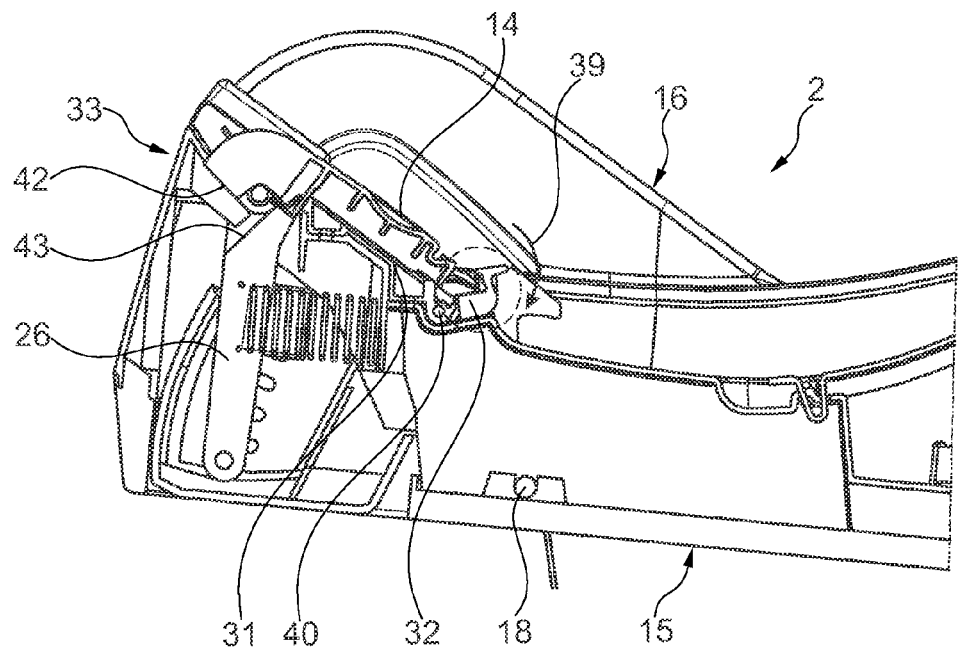
FIG. 8 is an enlarged sectional side view of the part of the base shown in FIG. 7 with the first step of unlocking the locking mechanism being performed.

The first step in order to release the locking mechanism 33 is illustrated in FIG. 8. FIG. 8 is a sectional view comparable to FIG. 7. The first action will be to remove the securing clip 32 from its rest position where it secures the free end of the belt clamping lever 14. This is done by rotating the clip 32 in a clockwise direction, as indicated by arrow 39, about the rotational axis 40 by of which the securing clip 32 is connected to the belt receptacle part 31. By of loosening the securing clip 32, the belt clamping lever 14 may be lifted upwardly away from the belt receptacle part 31 and then rotating the belt clamping lever 14 in a counter-clockwise direction around the rotation axis 28 as indicated by arrow 41. This rotation action is continued until a first abutment face 4s on the belt clamping lever 14 abuts a second abutment face 43 formed on the locking lever element 26.

Figure 9:
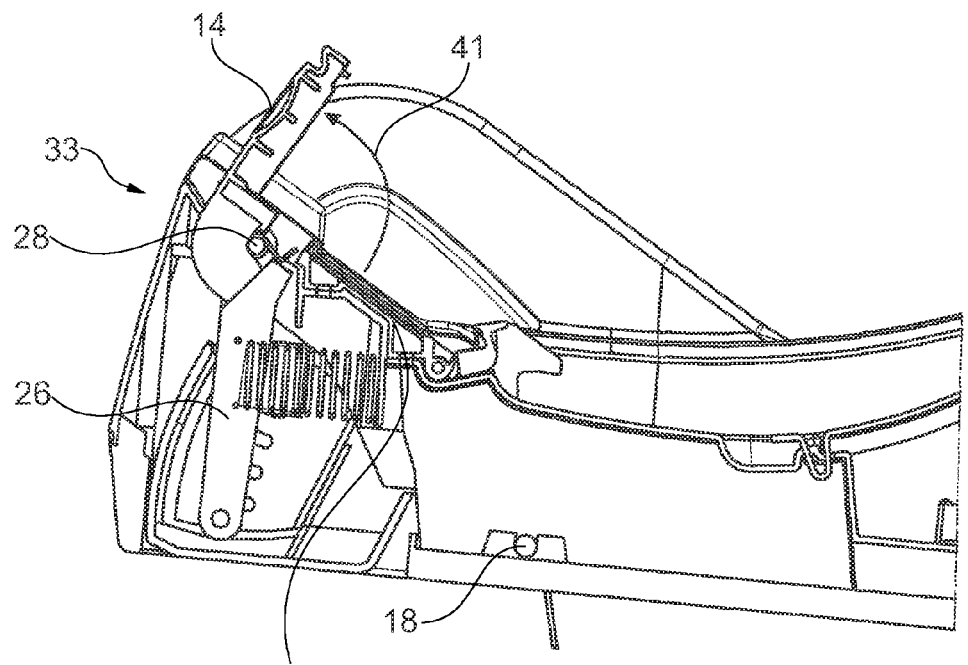
FIG. 9 is an enlarged sectional side view of the part of the base shown in FIG. 7 with another step for unlocking the locking mechanism being performed.
Figure 10:
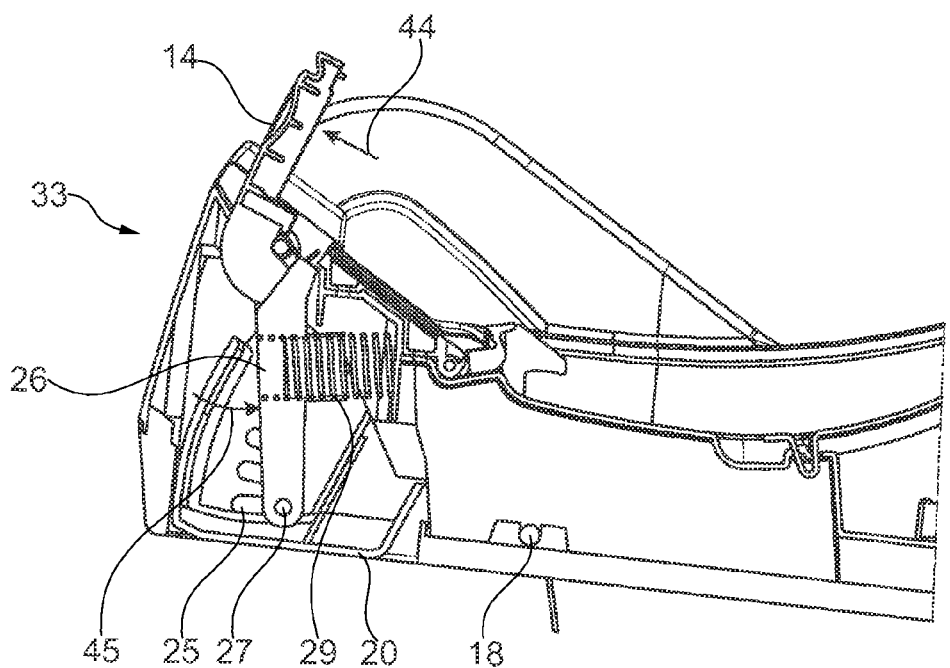
FIG. 10 is an enlarged sectional side view of the part of the base shown in FIG. 7 with the locking mechanism for the inclination-adjustor finally unlocked for repositioning the inclination-adjustor to another, second inclination position.

The resulting situation with the abutting abutment faces 42, 43 is shown in FIG. 9. Upon further pressing the belt clamping lever 14 in the direction indicated with the arrow 44 in FIG. 10, the locking lever element 26 is caused to rotate in a counter-clockwise direction, as indicated by arrow 45, by the interaction between the first and second abutment faces 42 and 43. The locking lever element 26 rotates in a counter-clockwise direction against the retaining force exerted by the compression spring 29, thereby removing the locking rod 27 from the slot 25 the rod 27 rests in and thus releasing the inclination adjustment element 20 from its present position and allowing the adjustment element 20 to move into another inclination position.

Figure 11:
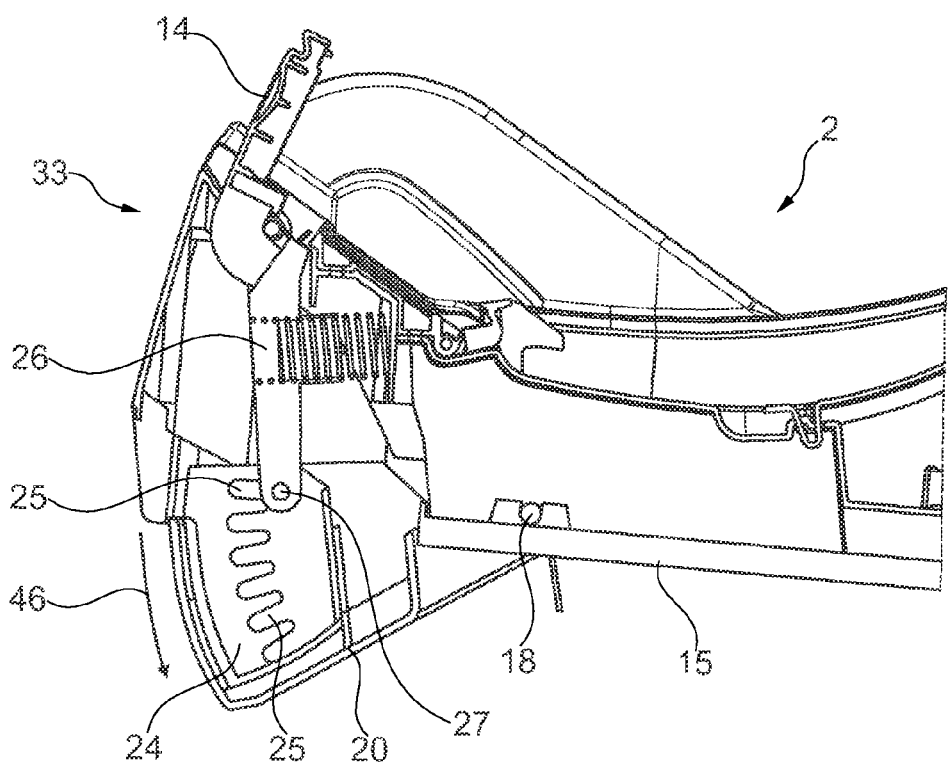
FIG. 11 is an enlarged sectional side view of the part of the base shown in FIG. 7 with the inclination-adjustor being adjusted to another, second inclination setting and the locking mechanism not yet in the final locking position.
Figure 14:
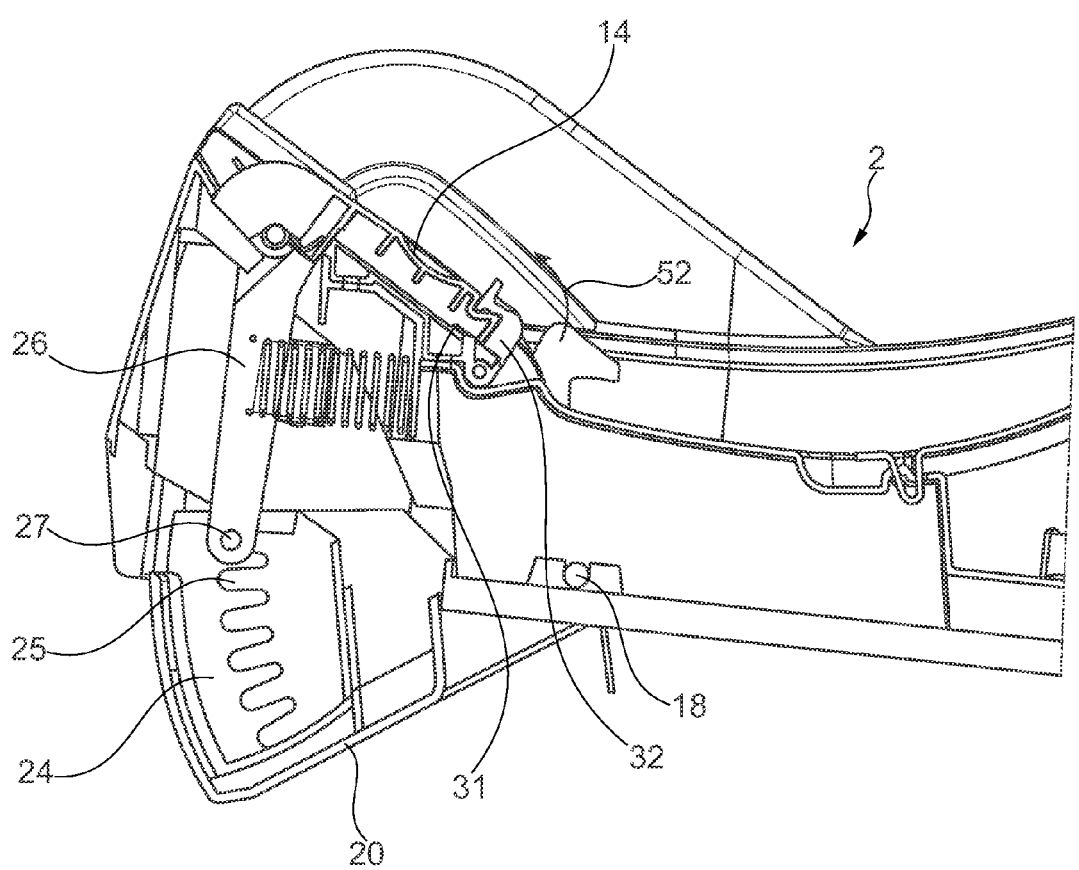
FIG. 14 is an enlarged sectional side view of the part of the base shown in FIG. 7 with a securing being put back into a securing position for securing the locking mechanism of the inclination-adjustor in the locking position with the inclination-adjustor being set to the second inclination position.

In FIG. 11 this change in the setting of the inclination adjustment element 20 is shown. Element 20 has been tilted in a way so as to protrude beyond the bottom plate part 15 of the base 2 and has moved in the direction as indicated by arrow 46. The locking rod 27 of the locking lever element 26 is shown resting in line with an upper slot 25 of the connecting member 24, ready to be fed into the said slot 25. By means of holding the clamping lever 14 in the position shown in FIG. 11 and further by the interactive action of the abutment faces 42 and 43, the locking lever element 26 is held back from turning clockwise. In order to allow the locking rod 27 to enter the slot 25 of the connecting member 24 of the inclination adjustment element 20, the belt clamping lever 14 is allowed to rotate back in a clockwise direction, as indicated by arrow 47 in FIG. 12. This will lead to a clockwise rotation of the locking lever element 26 as indicated by arrow 48 in FIG. 12, caused by the return force exerted by compression spring 29 on the locking lever element 26. In this state, the inclination adjustment element 20 is already caught in the pre-set and desired position. In order to further lock the locking mechanism 33, clamping lever 14 is further rotated in the clockwise direction as indicated by arrow 49 in FIG. 13 until the clamping lever 14 firmly rests against the belt receptacle part 31 once again with the vehicle seatbelt clamped between these two elements. This is not shown in this Figure. In this situation, a third abutment face 50 formed on the belt clamping lever 14 gets to abut and rest against a fourth abutment face 51 formed on the locking lever element 26. This situation, which is shown in the enlargement of FIG. 13a, provides for a blocking action keeping the locking lever element 26 in the locking position with the locking rod 27 caught in the slot 25 by a positive fit. Finally, and as shown in FIG. 14, the securing clip 32 is rotated back into the rest position in a counter-clockwise direction as indicated by arrow 52 in FIG. 14. By now the inclination adjustment element 20 is firmly locked in another preselected position, adapting the base 2 to another inclination situation according to a specific vehicle seat which the base 2 rests on.

Again it will be apparent to a person skilled in the art that, for performing all the manipulations described with respect to FIGS. 7 to 14, the seat element 3 needs to be removed from the base 2. Further, it should be clear that after inclination adjustment by setting the position of the inclination adjustment element 20 has taken place and the vehicle seatbelt is firmly clamped between the belt receptacle part 31 and the belt clamping lever 14, the base 2 is securely fastened to the vehicle seat the base 2 has been placed on. Furthermore, the inclination of the inclination adjustment member 20 has been adjusted in a proper way to fit to the situation of the respective vehicle seat with the base 2 being properly leveled and oriented to receive the seat element 3 in a safe and correct position. It will be apparent to a person skilled in the art that after putting on the seat element 3 to the base 2 and firmly connecting these two parts with one another, the inclination-adjustor and its locking mechanism will not be possible to manipulate or readjust from outside of the child safety seat 1 without again removing the seat element 3 from the base 2. Consequently, there cannot be any willful or accidental messing around with the inclination-adjustor which would cause a hazardous maladjustment of the base 2 and consequently of the child safety seat 1. This maladjustment might cause severe harm to a child received the child safety seat 1 in the event of an accident due to improper leveling and adjustment of the child safety seat's position.

For allowing a control of correct leveling of the base 2 by of adjusting the inclination-adjustor with putting the inclination adjustment element 20 in a correct position, the base may be equipped with a suitable level indicator which e.g. might indicate the correct leveling by optical means. Such level indicators are well known in the art and do not need to be described in detail, thus.

Again it is to be stated that the description of the embodiment given above is only to be meant as an exemplary and possible way to carry out the invention while many other ways will come up with a person skilled in the art and will be apparent to him.

The invention claimed is:

1. A child safety seat for use in a vehicle comprising:
a base adapted to be placed on and secured to a vehicle seat, said base comprising a base body;
a seat element having an upper surface and a lower surface, the upper surface of the seat element defining a seat area and a backrest;
the seat element further having a first connector;
the base having a second connector for lockably interacting with the first connector when the seat element is placed in a receiving position on the base with the lower surface of the seat element facing the base in order to releasably attach the seat element to the base;
the base further having an inclination-adjustor connected to the base body and being selectively adjustable in at least two different adjustment positions relative to the base body for adjusting the inclination of the base with respect to the surface of the vehicle seat the base is placed on;
the inclination-adjustor comprising a locking mechanism for locking the inclination-adjustor in a selected adjustment position and for releasing the inclination-adjustor in order to allow for selection of another adjustment position;
wherein the locking mechanism includes an actuator for operating the locking mechanism to lock or release the inclination-adjustor and wherein the actuator is placed on the base in a position that is covered by the lower surface of the seat element when the latter is fixed to the base and in such a way that the actuator cannot be accessed by a user without unlocking the first and second connectors and separating the seat element from the base.

2. The child safety seat according to claim 1, wherein the base contains a belt receiver adapted to receive a vehicle seatbelt in order to secure the base to the vehicle seat, and wherein the belt receiver comprises a belt clamping element for clampingly fixing the seatbelt to the receiver, wherein said belt clamping element is movable between a clamping position, in which the clamping element clampingly fixes the seatbelt fed into the belt receiver, and an open position, in which the clamping element releases the seatbelt, and wherein the belt clamping element further comprises the actuator of the locking mechanism.

3. The child safety seat according to claim 2, wherein the belt clamping element is a belt clamping lever.

4. The child safety seat according to claim 2, wherein the locking mechanism comprises a locking element being movably connected to the base for moving between a locking position and a release position and including a locking pin, and a connecting member being fixed to the inclination-adjustor, said connecting member having at least two slots at different positions for interlockingly receiving the locking pin when the inclination-adjustor is adjusted in respective adjustment positions, wherein the locking element further includes a first abutment face and the belt clamping element includes a second abutment face, wherein the first and second abutment faces are arranged in a way that when moving the belt clamping lever to an unlocking position the second abutment face engages the first abutment face thereby forcing the locking element to move from the locking position in which the locking pin rests in one of the slots of the connecting member, to the release position in which the locking pin is retracted from the slots and the connecting member is movable relative to the locking element in order to adjust the inclination-adjustor.

5. The child safety seat according to claim 4, wherein the locking element is a locking lever.

6. The child safety seat according to claim 4, wherein the belt clamping element includes a third abutment face and the locking element includes a fourth abutment face, wherein the third abutment face engages the fourth abutment face in a way so as to retain the locking element in the locking position when the belt clamping element is in the clamping position.

7. The child safety seat according to claim 4, wherein the belt clamping element must be moved from its clamping position beyond the open position to reach the unlocking position.

8. The child safety seat according to claim 2, wherein the belt clamping element is pivotable relative to the base body about a first pivot axis.

9. The child safety seat according to claim 4, wherein the locking element is pivotable relative to the base body about a second pivot axis.

10. The child safety seat according to claim 1, wherein the inclination adjustor comprises an adjustment plate which is connected to the base via a pivot axis which axis is generally parallel to a surface plane of the adjustment plate, wherein the adjustment plate is pivotable with respect to the base body between differing pivot positions and is lockable in at least two different of said pivot positions by of the locking mechanism.

11. The child safety seat according to claim 1, wherein the locking mechanism contains a resilient element applying a spring load to the locking mechanism forcing the locking mechanism into a position locking the inclination-adjustor.

12. The child safety seat according to claim 4, comprising a spring element acting on the locking element and applying a spring force that forces the locking element into the locking position.

13. The child safety seat according to claim 2, wherein the clamping element is arranged on an upper surface of the base which upper surface of the base faces the lower surface of the seat element when the seat element and the base are attached to one another by of the first and second connectors and when the seat element is attached to the base, the lower surface of the seat element is in close proximity to the upper surface of the base at least in a region where the clamping element is arranged.

14. A base for a child safety seat adapted for being placed on and secured to a vehicle seat and for interlockingly receiving a seat element, said base having—a base body;—an inclination-adjustor connected to the base body and being selectively adjustable to at least two different adjustment positions relative to the base body for adjusting the inclination of the base with respect to a seat surface of the vehicle seat the base is placed on;—an upper surface adapted to receive the seat element with a lower surface thereof resting against said upper surface; and—a connector for connecting to the seat element being received on the base;—the inclination-adjustor comprising a locking mechanism for locking the inclination-adjustor in a selected adjustment position and for releasing the inclination-adjustor in order to allow for selecting another adjustment position;—wherein the locking mechanism comprises an actuator for operating the locking mechanism to lock or release the inclination-adjustor adjustor and wherein the actuator is placed on the upper surface of the base in a position that is covered by the lower surface of the seat element when the latter is fixed to the base and in such a way that the actuator cannot be accessed by a user without unlocking the first and second connectors and separating the seat element from the base.

15. The base according to claim 14, comprising a belt receiver adapted to receive a vehicle seatbelt in order to secure the base to the vehicle seat, and wherein the belt receiver comprises a belt clamping element for clampingly fixing the seatbelt to the receiver, wherein said belt clamping element is movable between a clamping position, in which the belt clamping element clampingly fixes the seatbelt fed into the belt receiver, and an open position, in which the belt clamping element releases the seatbelt, wherein the belt clamping element further comprises the actuator of the locking mechanism.

16. The base according to claim 15, wherein the belt clamping element is a belt clamping lever.

17. The base according to claim 15, wherein the locking mechanism comprises a locking element being movably connected to the base for moving between a locking position and a release position and including a locking pin, and a connecting member being fixed to the inclination-adjustor, said connecting member having at least two slots at different positions for interlockingly receiving the locking pin when the inclination-adjustor is adjusted in respective adjustment positions, wherein the locking element includes a first abutment face and the belt clamping element includes a second abutment face, wherein the first and second abutment faces are arranged in a way that when moving the belt clamping lever to an unlocking position, the second abutment face engages the first abutment face thereby forcing the locking element to move from the locking position, in which the locking pin rests in one of the slots of the connecting member, to the release position, in which the locking pin is retracted from the slots and the connecting member may be moved relative to the locking element in order to adjust the inclination-adjustor.

18. The base according to claim 17, wherein the locking element is a locking lever.

19. The base according to claim 17, wherein the belt clamping element includes a third abutment face and the locking element includes a fourth abutment face, wherein the third abutment face engages the fourth abutment face in a way to retain the locking element in its locking position when the belt clamping element is in its clamping position.

20. The base according to claim 17, wherein the belt clamping element must be moved from its clamping position beyond the open position to reach the unlocking position.

21. The base according to claim 15, wherein the belt clamping element is pivotable relative to the base body about a first pivot axis.

22. The base according to claim 17, wherein the locking element is pivotable relative to the base body about a second pivot axis.

23. The base according to claim 14, wherein the inclination-adjustor comprises an adjustment plate which is connected to the base via a pivot axis, which axis is generally parallel to a surface plane of the adjustment plate, wherein the adjustment plate is pivotable with respect to the base body between differing pivot positions and is lockable in at least two different of said pivot positions by of the locking mechanism.

24. The base according to claim 14, wherein the locking mechanism contains a resilient element applying a spring load to the locking mechanism forcing the locking mechanism into a position locking the inclination-adjustor.

25. The base according to claim 17, comprising a spring element acting to the locking element and applying a spring force that forces the locking element into the locking position.

* * * * *

UNITED STATES PATENT AND TRADEMARK OFFICE
CERTIFICATE OF CORRECTION

| | | |
|---|---|---|
| PATENT NO. | : 9,592,751 B2 | Page 1 of 1 |
| APPLICATION NO. | : 14/461052 | |
| DATED | : March 14, 2017 | |
| INVENTOR(S) | : Matthias Kirstein | |

It is certified that error appears in the above-identified patent and that said Letters Patent is hereby corrected as shown below:

In the Claims

Column 12, Lines 15-16 (Claim 14) change "inclination-adjustor adjustor" to --inclination-adjustor--

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*